Sept. 9, 1952 W. H. UHL 2,609,790
ENVELOPE SEALING MACHINE
Filed March 18, 1949 10 Sheets-Sheet 6
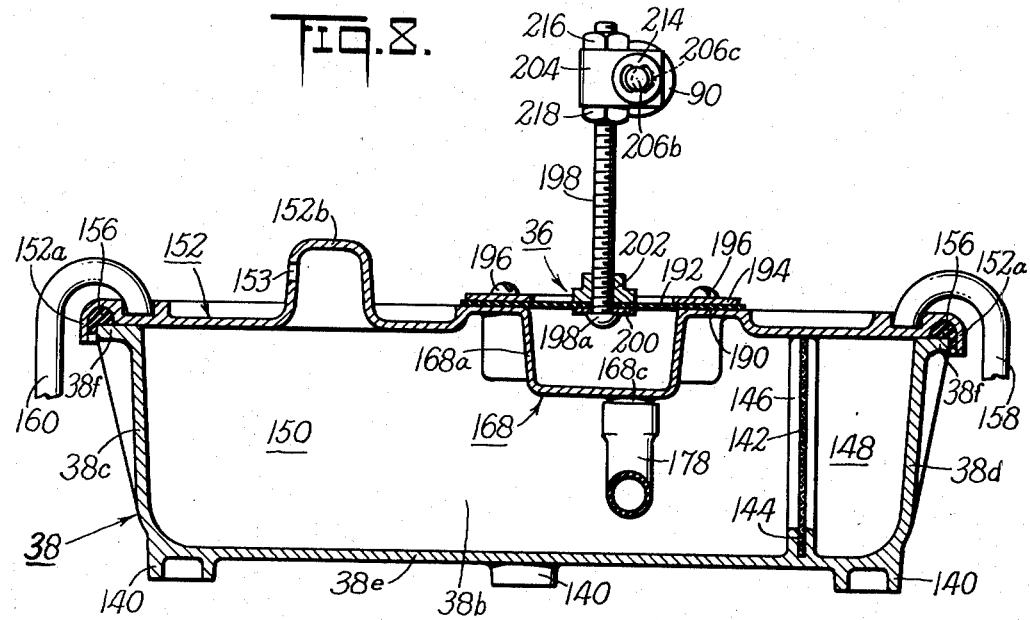
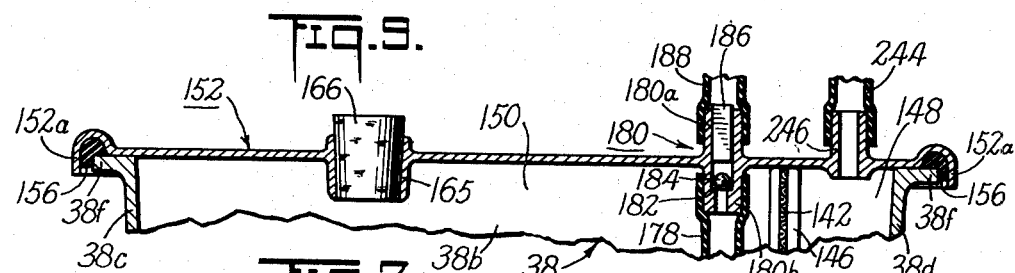
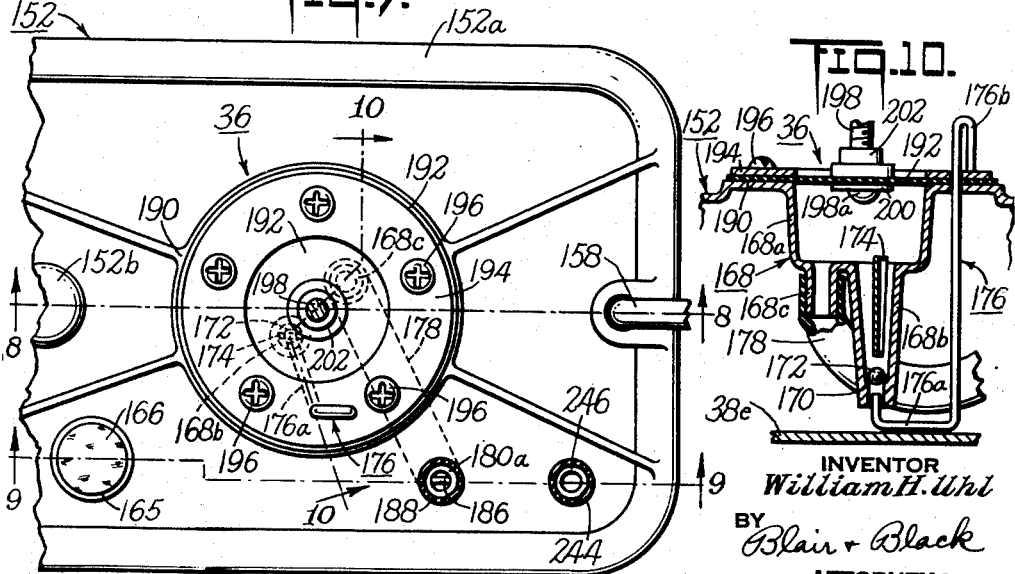
INVENTOR
*William H. Uhl*
BY
*Blair & Black*
ATTORNEYS Sept. 9, 1952 W. H. UHL 2,609,790
ENVELOPE SEALING MACHINE
Filed March 18, 1949 10 Sheets-Sheet 7
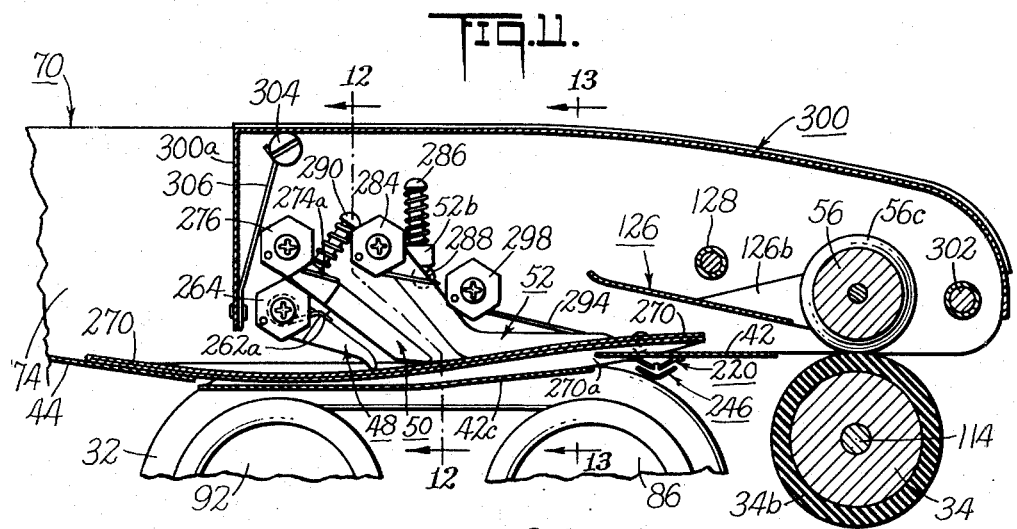
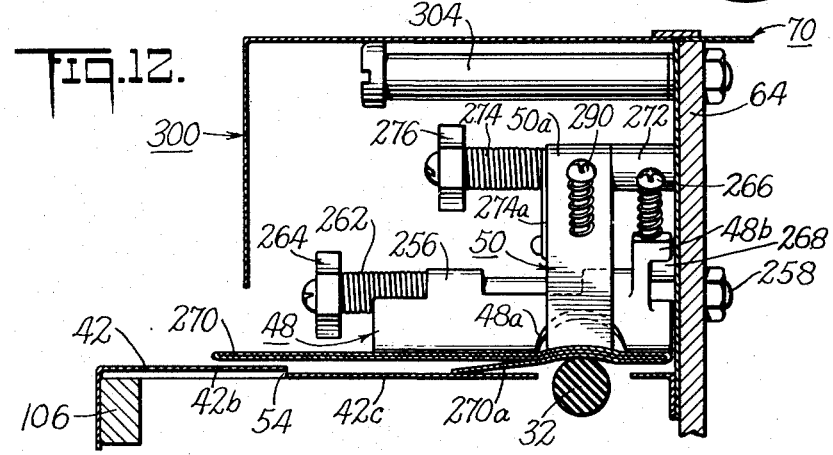
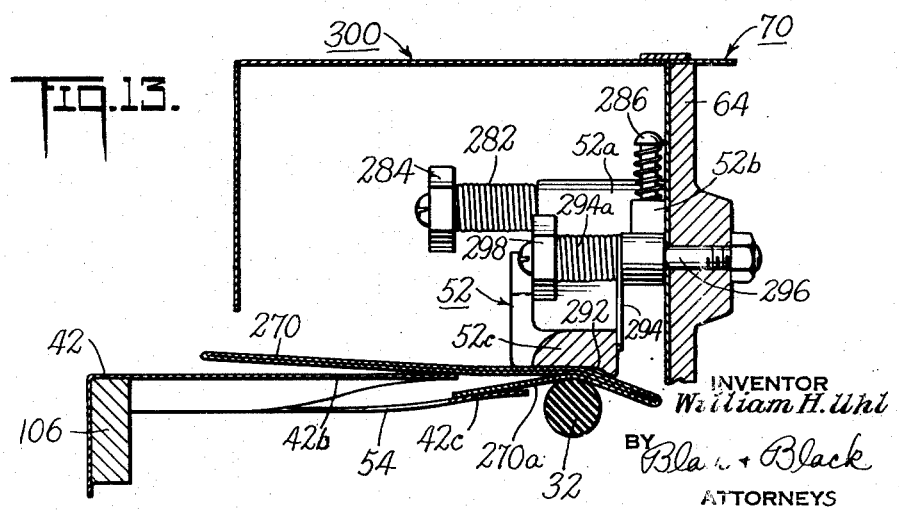
INVENTOR
William H. Uhl
BY Black + Black
ATTORNEYS Sept. 9, 1952 W. H. UHL 2,609,790
ENVELOPE SEALING MACHINE
Filed March 18, 1949 10 Sheets-Sheet 8
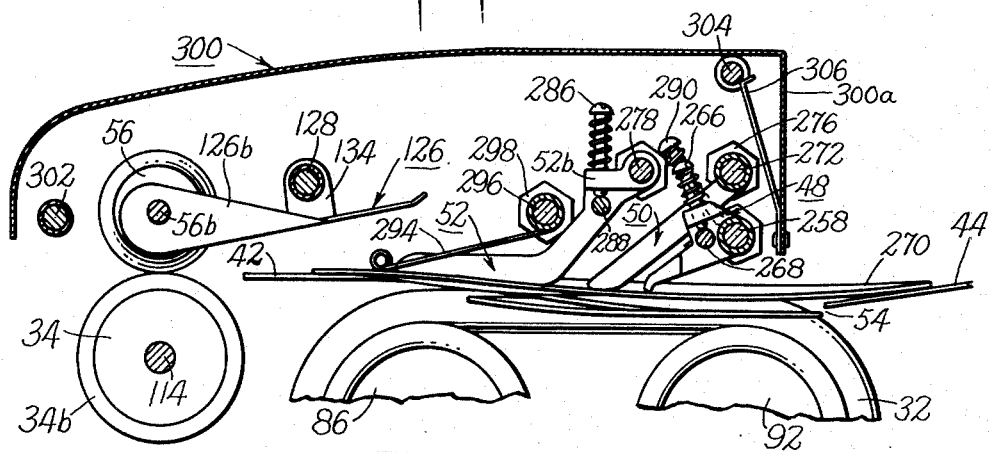
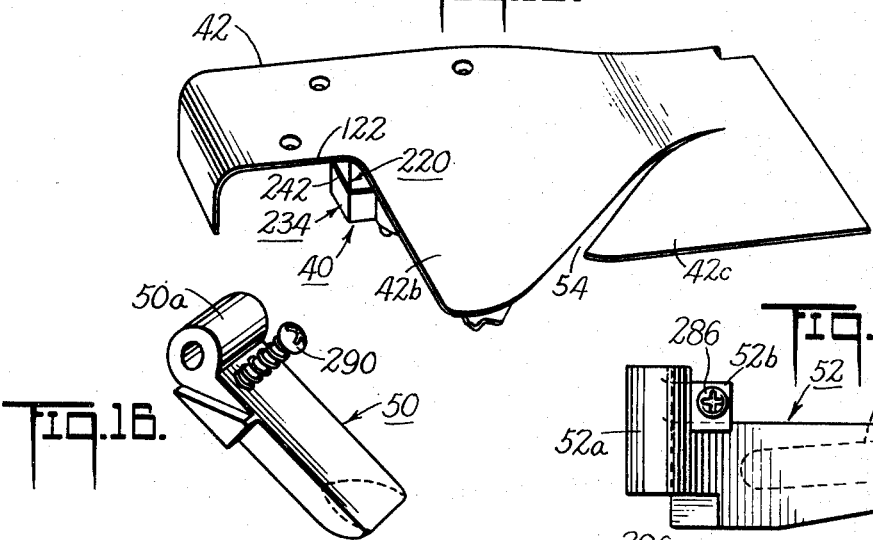
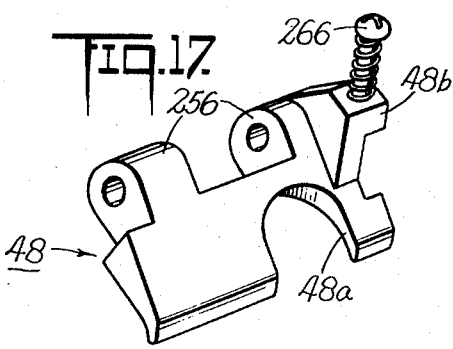
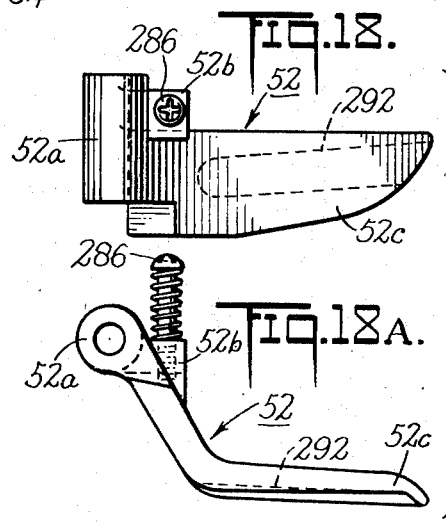
INVENTOR
*William H. Uhl*
BY
*Blair + Black*
ATTORNEYS

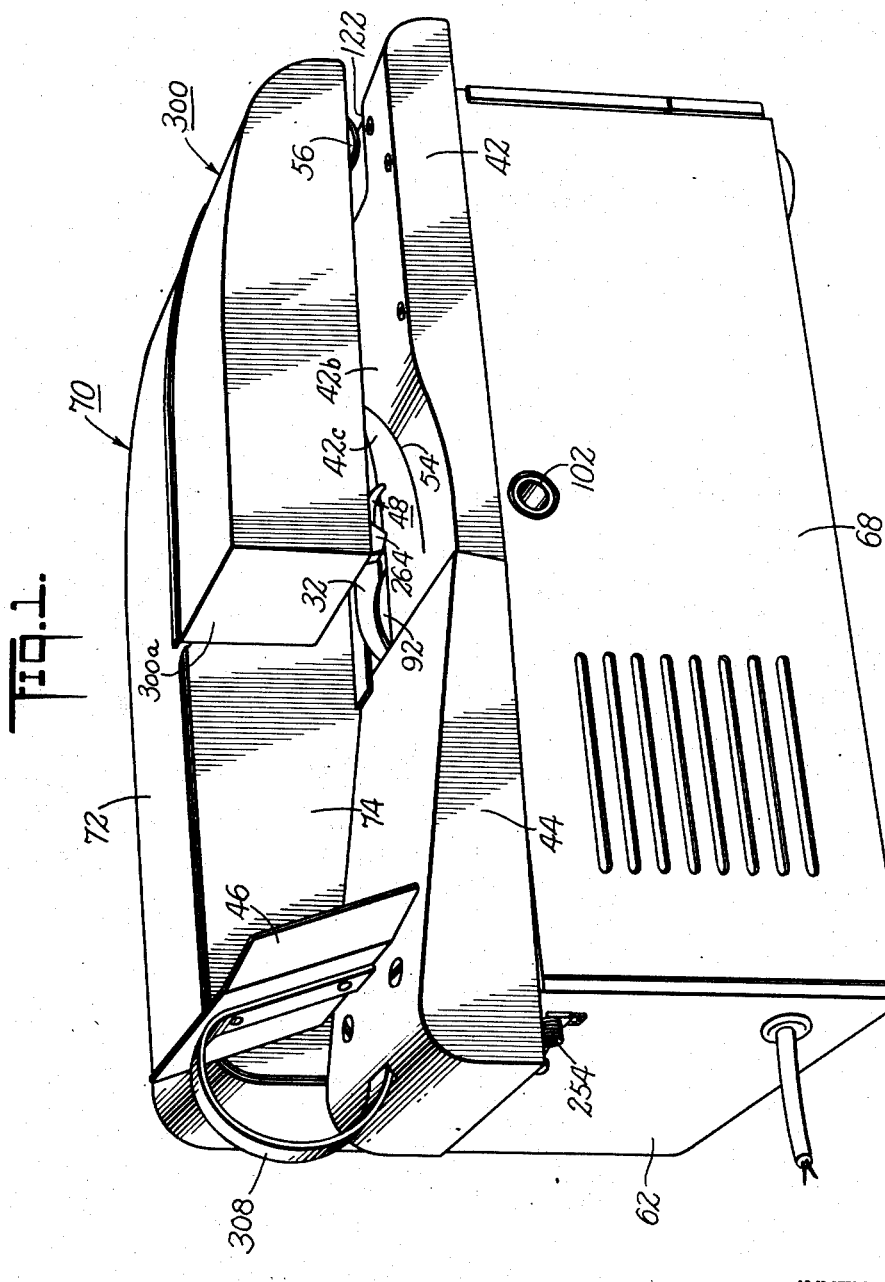

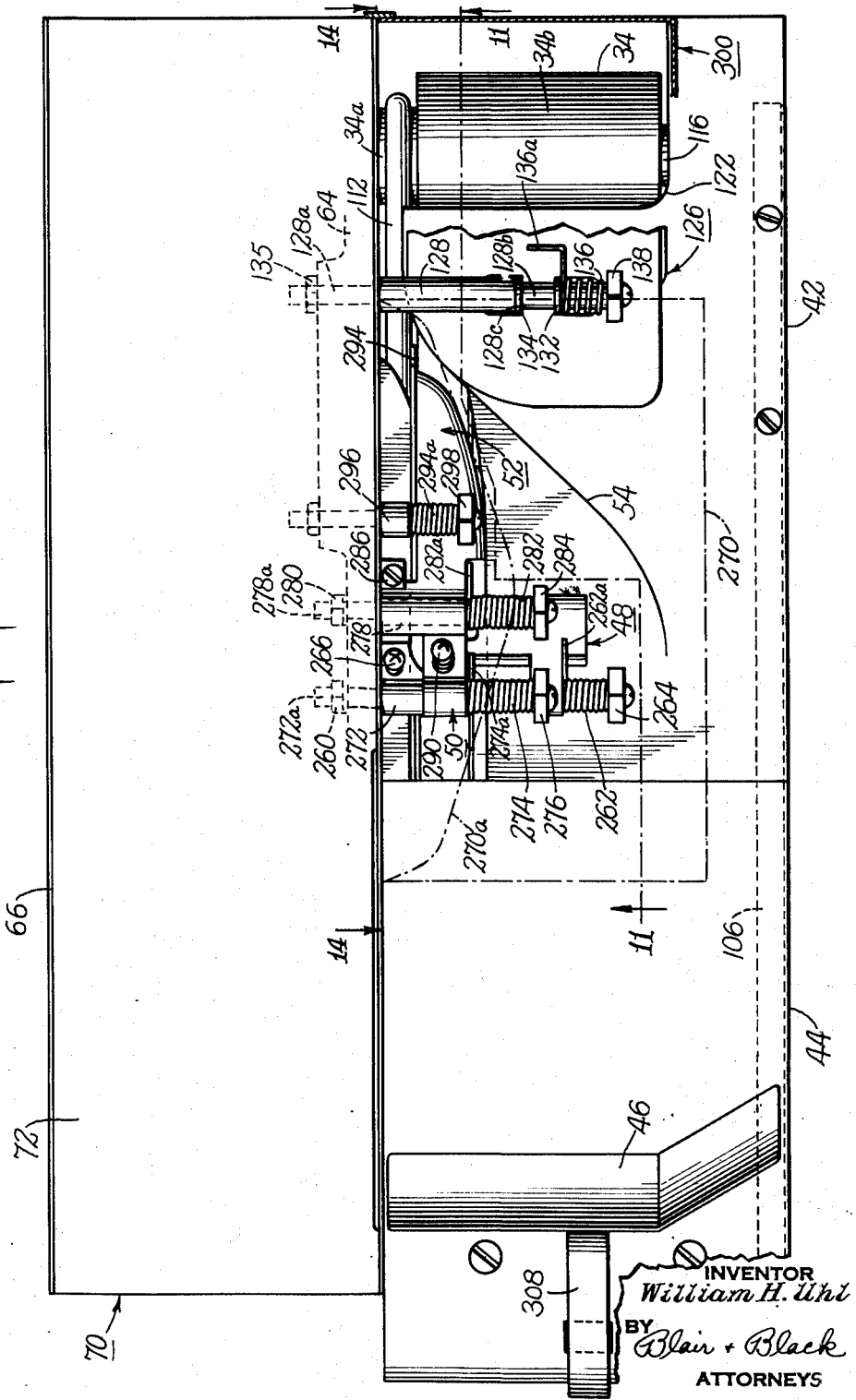

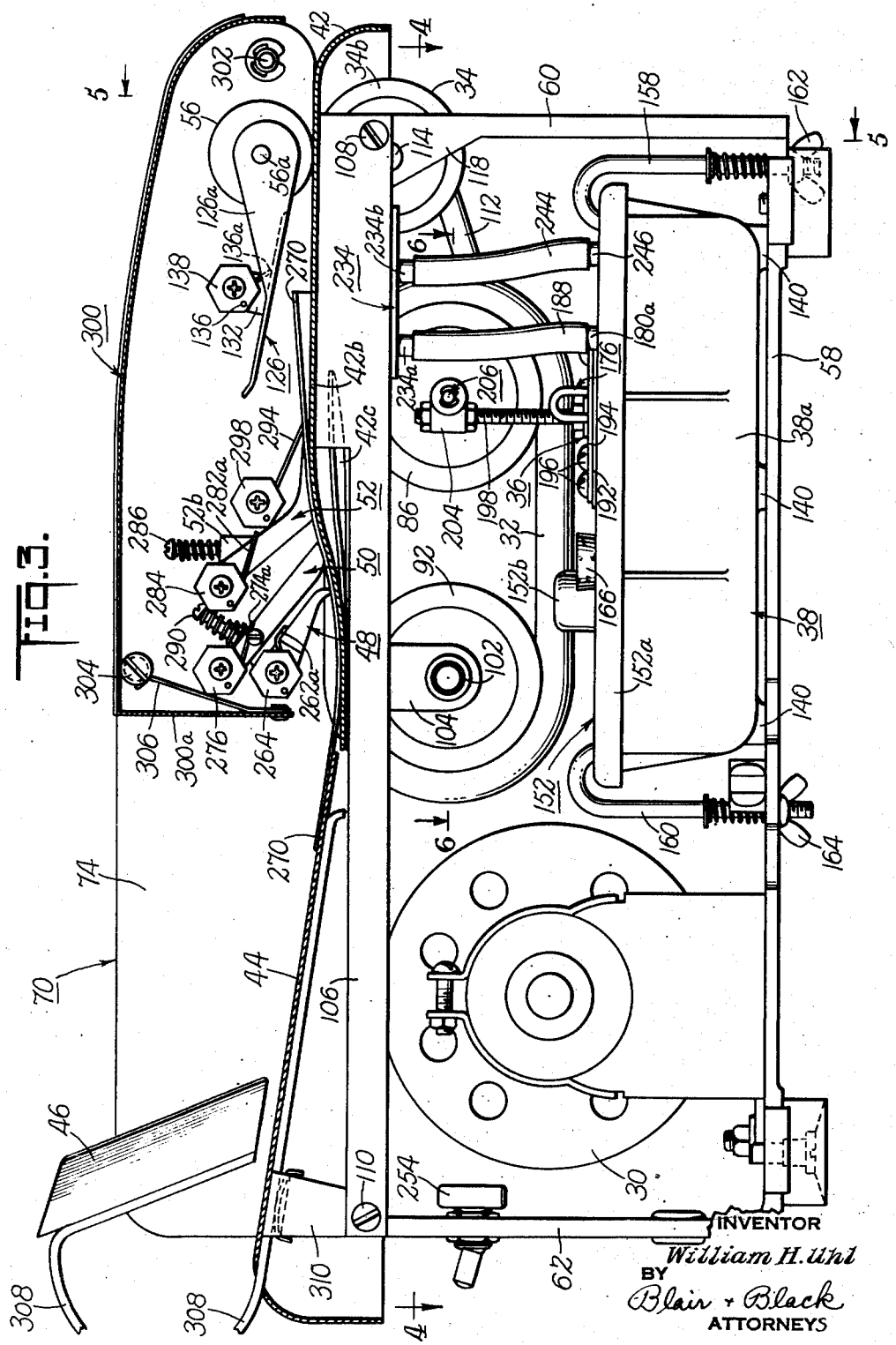

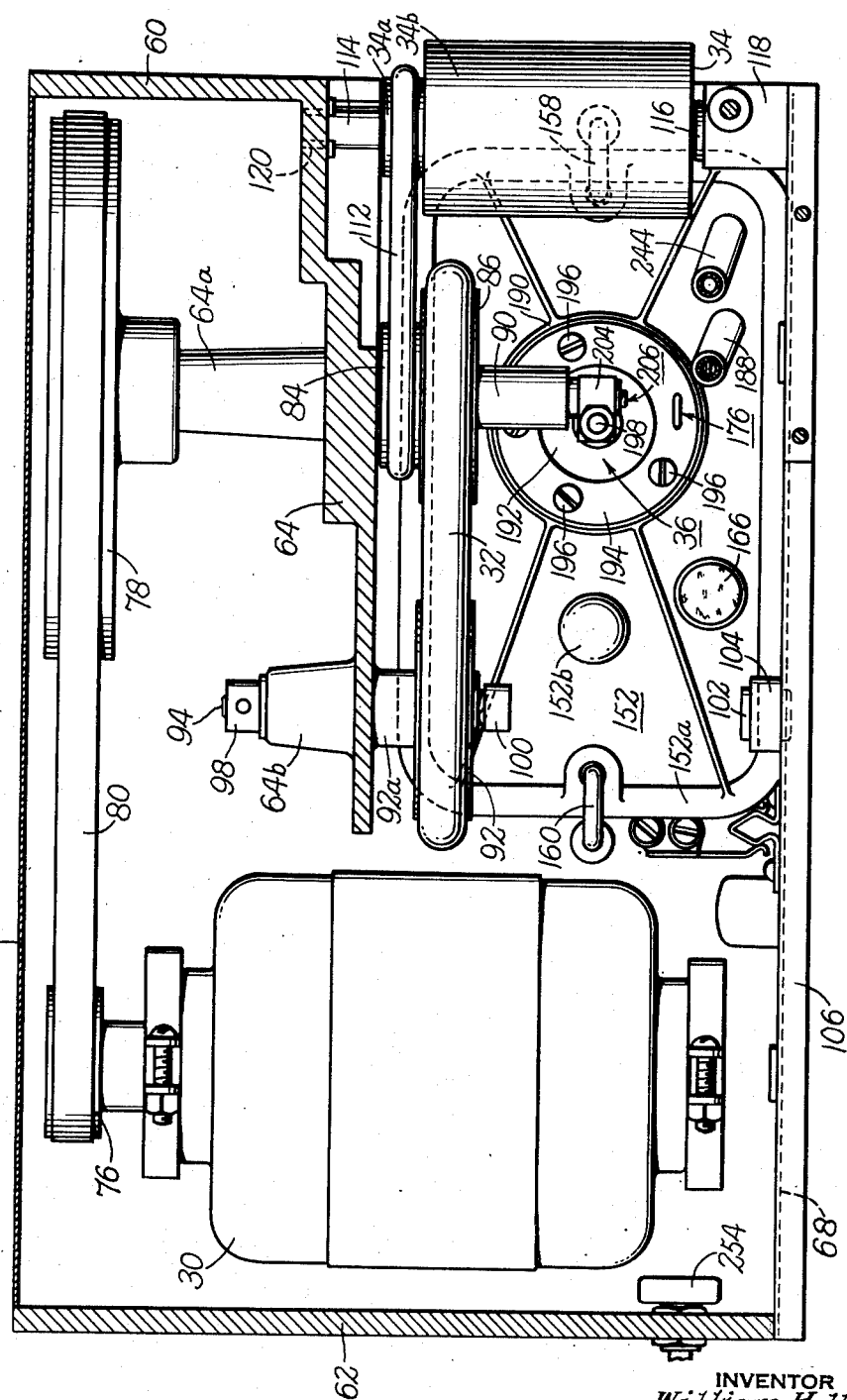

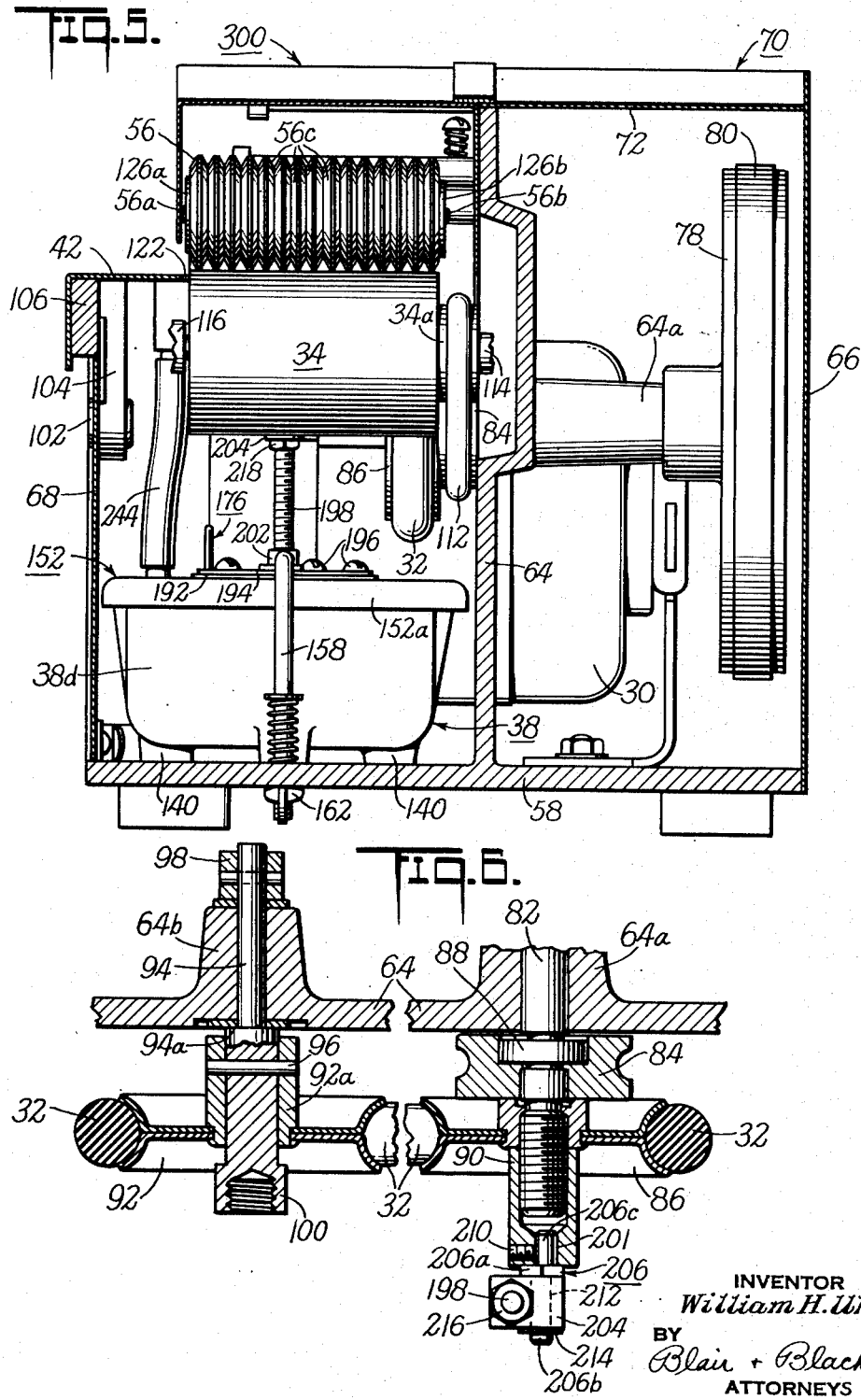

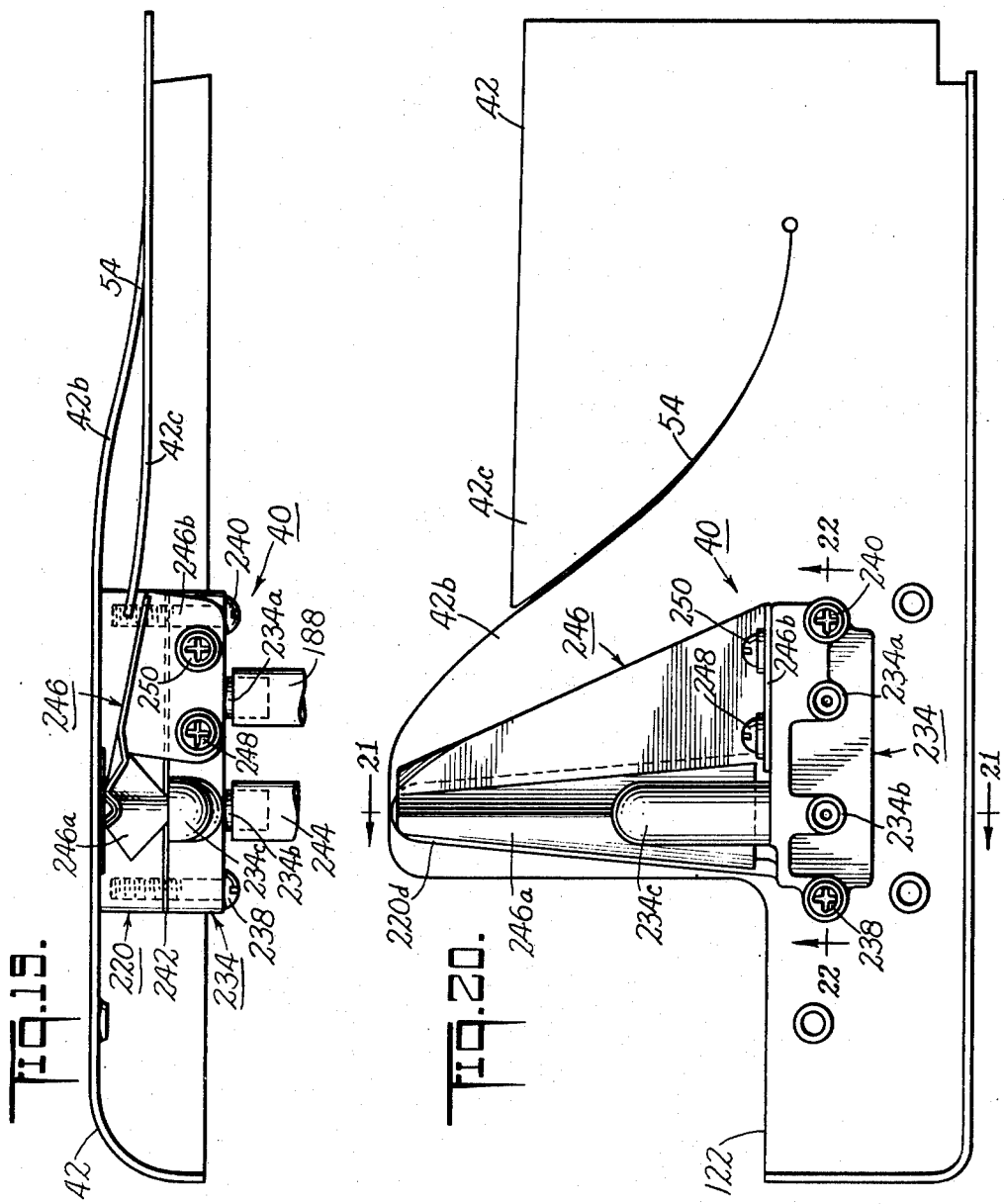

Sept. 9, 1952 W. H. UHL 2,609,790
ENVELOPE SEALING MACHINE
Filed March 18, 1949 10 Sheets-Sheet 10
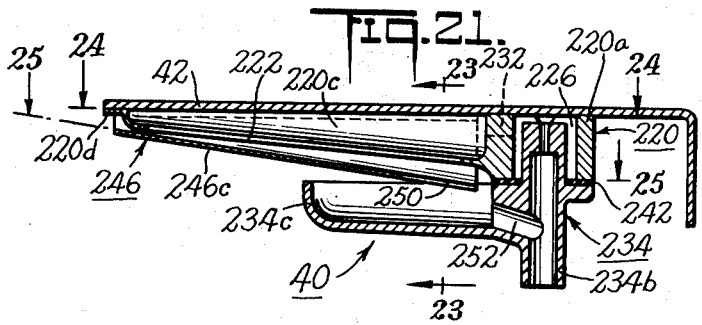
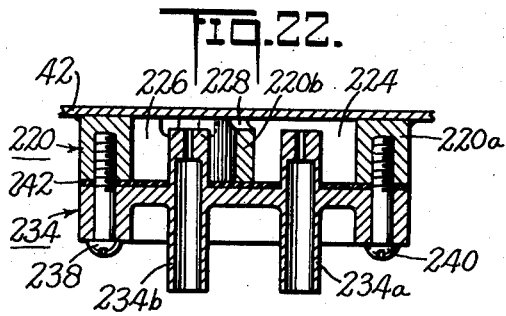 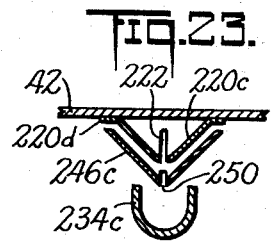
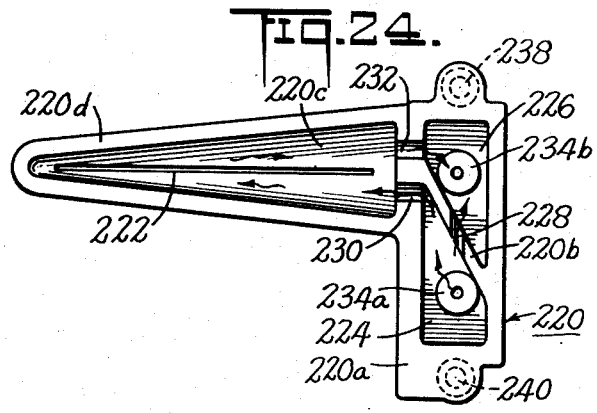
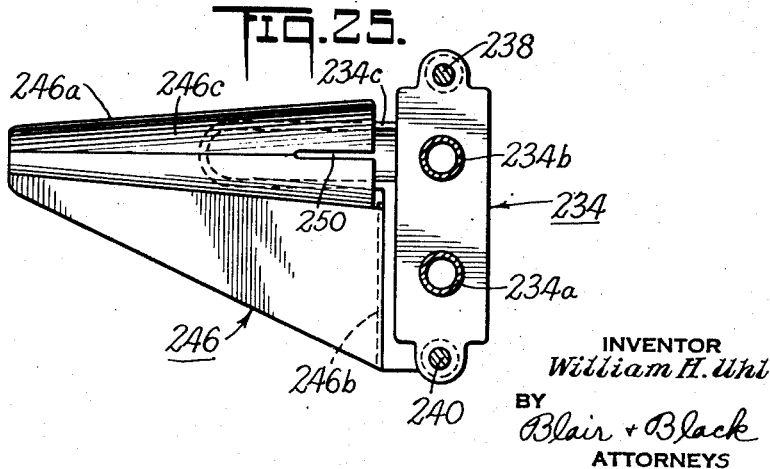
INVENTOR
*William H. Uhl*
BY
*Blair & Black*
ATTORNEYS Patented Sept. 9, 1952

2,609,790

UNITED STATES PATENT OFFICE 2,609,790

ENVELOPE SEALING MACHINE

William H. Uhl, Rochester, N. Y., assignor to Commercial Controls Corporation, Rochester, N. Y.

Application March 18, 1949, Serial No. 82,037

11 Claims. (Cl. 118—401)

This invention relates to a letter sealing machine.

One of the objects of this invention is to provide a new and improved letter sealing machine. Another object is to provide a machine of the above character which is efficient and dependable in operation, simple and sturdy in construction, and relatively inexpensive to build, operate and maintain. Another object is to provide a machine of the above character which is able to seal a maximum of letters in a minimum of time. A further object is to provide a machine of the above character, in which the moistening of the flap of each envelope passing through the machine is assured. A still further object is to provide a machine of the above character which will efficiently seal envelopes of a large number of different thicknesses and sizes. Other objects will be in part obvious and in part pointed out hereinafter.

The invention accordingly consists in the features of construction, combinations of elements, and arrangements of parts, all as will be illustratively described herein and the scope of the application of which will be indicated in the following claims.

In the accompanying drawings, in which is shown one of the various possible embodiments of this invention:

Figure 1 is a perspective view of a complete machine;

Figure 2 is a top plan view of the machine, certain parts being removed for purposes of illustration;

Figure 3 is a front elevation of the machine, certain parts of the housing being removed and other parts shown in section for purposes of illustration;

Figure 4 is a horizontal section taken on the line 4—4 of Figure 3;

Figure 5 is a staggered vertical section taken on the line 5—5 of Figure 3;

Figure 6 is a horizontal section on an enlarged scale taken on the line 6—6 of Figure 3; certain parts being broken away for purposes of illustration;

Figure 7 is a top plan on an enlarged scale of the water tank shown in Figure 3;

Figure 8 is a staggered vertical section taken through the water tank on the line 8—8 of Figure 7;

Figure 9 is a staggered vertical section showing the upper portion of the water tank taken on the line 9—9 of Figure 7;

Figure 10 is a staggered vertical section taken on the line 10—10 of Figure 7;

Figure 11 is a staggered vertical section taken on the line 11—11 of Figure 2;

Figure 12 is a staggered vertical section taken on the line 12—12 of Figure 11;

Figure 13 is a vertical section taken on the line 13—13 of Figure 11;

Figure 14 is a vertical section taken on the line 14—14 of Figure 2;

Figure 15 is a perspective view of the sealer table;

Figure 16 is a perspective view of one of the pressure feet shown in Figure 14;

Figure 17 is a perspective view of the separator foot;

Figure 18 is a plan of another pressure foot;

Figure 18a is a side elevation of the pressure foot shown in Figure 18.

Figure 19 is a rear view of the sealer table shown in Figure 15 when detached from the machine;

Figure 20 is a bottom plan of the sealer table shown in Figures 15 and 19;

Figure 21 is a vertical section taken on the line 21—21 of Figure 20;

Figure 22 is a vertical section taken on the line 22—22 of Figure 20;

Figure 23 is a vertical section taken on the line 23—23 of Figure 21;

Figure 24 is a horizontal section taken on the line 24—24 of Figure 21; and

Figure 25 is a staggered horizontal section taken on the line 25—25 of Figure 21.

Similar reference characters refer to similar parts throughout the several views of the drawings.

In general, the machine includes a motor 30 (Figures 3 and 4), which drives a conveyor belt 32 and feed roller 34 through pulley and belt assemblies to be described hereinafter. Motor 30 also actuates a diaphragm pump, generally indicated at 36 (Figures 3 and 4), mounted on a tank, generally indicated at 38. Diaphragm pump 36 (Figure 3) pumps water upwardly to the sealer blade assembly, generally indicated at 40 (Figures 19 and 20) mounted on sealer table 42 and continuously circulates water through the sealer blade. This prevents the sealer blade from becoming clogged by adhesive or other foreign material, all as will be clearly pointed out hereinafter. The supply of envelopes to be sealed is supported by the hopper table 44 and the guide 46 (Figures 1 and 2). Envelopes are removed from the stack positioned above hopper table 44 by conveyor belt 32 one at a time. Conveyor belt 32 feeds the envelopes beneath the pressure feet, generally indicated at 50 and 52, which twist the envelope so that its flap passes through slot 54 in sealer table 42 and thence beneath the sealer blade and sealer blade assembly. After the flap of the envelope has been moistened, it passes between feed roller 34 and pressure roller 56, which, as they feed each envelope from the machine, presses the flap into contact with the envelope, sealing it.

In detail, the machine is built on a cast frame including an integral bottom 58 (Figures 3, 4 and 5), a pair of end walls 60 and 62, and center wall 64. The front and back of the machine are closed by removable covers 66 and 68. It will be noted that the rear portion, generally indicated at 70, of the machine extends above the level of sealer and hopper tables 42 and 44, which cover the front portion of the machine. The top of the rear portion on the machine is covered by a sheet metal cover 72 (Figure 1), and the front of rear portion 72 is covered by a vertically positioned plate 74.

The base of motor 30 is secured to bottom 58 (Figures 3 and 4) and it has a pulley 76 mounted on and secured to its drive shaft, which drives pulley 78 through a belt 80. Pulley 78 (Figure 4) is mounted on and secured to the rear end of shaft 82 (Figure 6), which is rotatably mounted in a bearing member 64a formed on center wall 64. On the forward side of wall 64 (Figures 4 and 6), a pair of pulleys 84 and 86 are mounted on and connected to shaft 82. To mount pulleys 84 and 86 on shaft 82, shaft 82 is provided with an enlarged portion 88, against which the hub portions of pulleys 84 and 86 are clamped by means of a hex nut 90.

As described above, the envelopes are fed from hopper table 44 across the sealer table 42 by means of conveyor belt 32. Conveyor belt 32 is driven by pulley 86 (Figures 3, 4 and 6), and its left-hand end, as viewed in Figure 3, is supported by pulley 92. The hub 92a of pulley 92 is pinned to a shaft 94 by a taper pin 96. Shaft 94 is rotatably mounted on a bearing member 64b formed as an integral part of wall 64. Shaft 94 is prevented from moving rearwardly by means of a shoulder 94a formed on shaft 94, and is prevented from moving forwardly by means of collar 98 pinned to shaft 94. Thus, as the motor drives pulley 86, it drives pulley 92 through belt 32. Thus, belt 32 (Figure 3) is driven by pulley 86 and is supported in envelope-feeding position by means of pulley 92. The upper portion of the belt, as viewed in Figures 2 and 3, is positioned beneath separator foot 48 and pressure feet 50 and 52, with which it coacts to feed the envelopes across sealer table 42.

Referring to Figure 6, the forward end of shaft 94 has a threaded hole 100 therein. This hole is aligned with a bearing 102 (Figures 3, 4 and 5) mounted on a bracket 104. Bracket 104 is secured to a supporting bar 106 (Figures 3, 4 and 5), which is secured to end walls 60 and 62 by screws 108 and 110 (Figure 3). Bearing 102 (Figure 1) extends through cover 68 and is adapted to receive the shank of a crank (not shown), the inner end of which threads into hole 100 (Figures 4 and 6) in shaft 94. Thus, pulley 92 may be manually driven by a crank and the remainder of the mechanism of the sealing machine driven through belt 32.

To drive feed roller 34, pulley 84 (Figures 4, 5 and 6) is connected to a pulley 34a formed on the hub of feed roller 34 by a belt 112. One end of feed roller shaft 114 (Figures 3, 4 and 5) is rotatably mounted on a bearing 116 (Figure 4) mounted on a bracket 118 (Figures 3 and 4) formed on end wall 60. The other end of shaft 114 is rotatably mounted on a bearing 120 mounted on center wall 64.

As best shown in Figures 11 and 15, the end of sealer table 42 has a cutout portion 122 therein to permit feed roller 34 to engage the undersurface of envelopes leaving the sealer table.

The envelopes are pressed into contact with feed roller 34 by pressure roller 56 (Figures 3, 5 and 11). Pressure roller 56 has stud shafts 56a and 56b (Figure 5) thereon, which rotatably mount roller 56 on the sides 126a and 126b of a support 126 (Figures 3, 5 and 11). Support 126 (Figure 2) is pivotally mounted on the forward end of a stud shaft 128 by means of a pair of right-angle brackets 132 and 134 (Figures 2 and 3) secured to the top surface of support 126. The rear portion of shaft 128 has a section 128a of reduced diameter, which extends through center wall 64. Shaft 128 is secured to wall 64 by means of nut 135. The forward portion 128b of shaft 128 is also of a reduced diameter to form a seat 128c between the forward portion of shaft 128 and its center section. The forward portion 128b of shaft 128 extends through aligned holes in the spaced upwardly-extending portions of brackets 132 and 134.

To hold support 126 properly aligned with respect to feed roller 34 and to resiliently press pressure roller 56 into contact with feed roller 34, a coil spring 136 is mounted on the outer end of portion 128b of support 128. This spring is maintained under compression longitudinally of its axis by means of a nut 138 mounted on the outer end of support 128. Thus, spring 136 resiliently presses against bracket 132 and holds bracket 134 in engagement with seat 128c. Spring 136 is also under coaxial tension, having one end anchored on nut 138 and the other end 136a (Figures 2 and 3) bearing downwardly upon the upper surface of support 126. This force resiliently holds roller 56 in engagement with feed roller 34 (Figures 5 and 11).

Referring to Figure 11, it will be noted that roller 34 has a rubber sleeve 34b mounted thereon, forming its feeding surface. This resilient surface of roller 34 coacts with the corrugations 56c (Figure 5) formed on the surface of pressure roller 56 to ensure feeding the envelopes without slippage, and also concentrates the pressure of pressure roller 56 to ensure complete sealing of each envelope. Thus, feeding and pressure rollers 34 and 56, when driven by belt 112 (Figures 4 and 5), feed envelopes from the machine as they are fed to them by conveyor belt 32, and at the same time, seal each envelope in an efficient and practical manner.

As pointed out hereinabove, the sealer blade assembly 40 (Figure 20), which is mounted on the undersurface of sealer table 42 and which moistens the gummed surface of the envelope flaps, is continuously supplied with a flow of water from tank 38 (Figure 3) when the machine is in operation. Tank 38 is made from a plastic material as a unit and includes integral side walls 38a and 38b (Figures 3 and 8), end walls 38c and 38d, and a bottom 38e. The tank is provided with feet 140 (Figures 3 and 8) to support it above the bottom 58 of the frame of the machine, and at its right-hand end (Figure 8) has a removable screen 142 mounted in a slot 144 in a supporting rib 146 which extends down sides 38a and 38b (Figures 3 and 8) and across the bottom 38e of tank 38. Screen 142 divides the tank 38 into overflow and supply sections 148 and 150 for purposes to be more fully disclosed hereinafter.

The top of tank 38 is closed by a cover, generally indicated at 152 (Figures 3, 4, 7 and 8). The edge of cover 152 is provided with a gasket seat 152a (Figure 8) for a gasket 156. Cover 152 (Figure 3) is held on tank 38 and tank 38 is held in position on the machine by a pair of hook-shaped clamps 158 and 160. The lower ends of clamps 158 and 160 are threaded and extend through holes in the bottom 58 of the frame of the machine. Wing nuts 162 and 164 are provided to draw clamps 158 and 160 into clamping relationship with respect to cover 152, and thus tank 38. When clamps 158 and 160 are tightened, gasket 156 (Figure 8) engages a flange 38f extending outwardly from the upper edge of the tank and thus seals the joint between cover 152 and tank 38.

To fill tank 38, it is provided with an opening 165 (Figure 9) in cover 152, which is closed by a removable plug 166 (Figures 4 and 9). When it is desired to fill tank 38, housing cover 68 (Figures 1 and 4) is removed, permitting ready access to opening 165, which is positioned adjacent the front of the machine. To permit air to enter the tank as water is removed from it, cover 152 is provided with a dome 152b (Figures 4 and 8), which has an opening 153 in the upper portion thereof.

Water is pumped to the sealer blade assembly by diaphragm pump 36. The casing, generally indicated at 168 (Figures 8 and 10) of the pump is formed as an integral part of the tank cover 152. The casing includes a well portion 168a which has a cylindrically-shaped wall and a bottom. Extending downwardly from well portion 168a is an intake duct 168b, the lower end of which is positioned adjacent the bottom 38e of tank 38. A ball 172 coacts with a seat 170 formed in the lower end of intake duct 168b to form the intake valve for the pump. To limit the upward movement of ball 172 during the intake stroke of the pump, a flat wedge 174 is wedged tightly into intake duct 168b from the upper end thereof.

During periods of extended usage, it is possible for foreign matter to collect in the supply section of the tank from which the diaphragm pump draws water. This foreign matter can enter intake duct 168b, and if the tank then dries because of non use, ball 172 may stick to seat 170. To provide ready means for freeing ball 172, a freeing wire, generally indicated at 176, is provided. This wire includes a U-shaped bottom portion 176a, one end of which is positioned in the lower end of duct 168b. Wire 176 extends upwardly through the cover of the tank to provide a portion 176b readily accessible to the operator of the pump. Thus, if the pump fails to pump, the operator raises the freeing wire 176 by portion 176b. The portion of wire 176 positioned in duct 168b then engages ball 172 and frees it from seat 170. As wire 176 is freely mounted in the hole through the cover and portions of the diaphragm pump, gravity at all times keeps it in an inoperative position except when it is being used to free ball 172.

The well 168a of pump 36 is provided with an exhaust duct 168c which extends downwardly from the pump to permit a plastic conduit 178 to be connected to it. Conduit 178 connects exhaust duct 168c to a check valve, generally indicated at 180, on cover 152 (Figure 9). The body of valve 180 is formed as an integral part of cover 152 and includes upper and lower tubular-shaped portions 180a and 180b. A valve seat 182 is formed in lower portion 180b and contacts with ball 184 to form the check valve. To limit the upward movement of ball 184 during the exhaust or pumping stroke of pump 36, a flat wedge 186 is wedged into the cylindrically-shaped upper section 180a of the body of check valve 180. A conduit 188 (Figures 3 and 9), which feeds water to the sealer blade assembly, is connected to the upper section 180a of the body of valve 180.

Referring to Figures 7 and 8, it will be seen that cover 152 is raised around the well portion 168a of pump casing 168 to form a seat 190 for the rubber diaphragm 192 of pump 36. The edge of diaphragm 192 is held in sealed relationship with seat 190 by means of a ring 194 (Figures 7 and 8), which is secured to cover 152 by means of screws 196. This leaves the center section of diaphragm 192, which is positioned over the well portion 168a of casing 168 of pump 36, free to be actuated by means of an actuating shaft 198 (Figures 3 and 8). Actuating shaft 198 is threaded and has its head 198a positioned beneath diaphragm 192. A washer 200 is positioned between head 198a and diaphragm 192, and the diaphragm is clamped against washer by means of a nut 202. This effectively seals the opening in diaphragm 192 through which shaft 198 passes.

The upper end of actuating shaft 198 is connected to an eccentric bearing 204, which is mounted on a fulcrum stud, generally indicated at 206 (Figure 6). Fulcrum stud 206 is connected to an eccentric hex nut 90, which, as described hereinabove, holds pulleys 84 and 86 on and connects them to shaft 82. Hex nut 90 has a hole 201 extending into its forward end, the axis of which is parallel to but spaced from the axis of shaft 82. Fulcrum stud 206 includes a hex-shaped portion 206a, a driving shaft 206b, the axis of which is aligned with the axis of hex-shaped portion 206a, and an eccentric portion 206c, the axis of which is spaced from but parallel to the axis of hex-shaped portion 206a and shaft 206b. Eccentric portion 206c fits eccentric hole 201 and is held in position therein by means of a set screw 210. Shaft 206b extends through a hole 212 (Figure 6) in eccentric bearing 204 and is held in position therein by means of a spring clip 214 (Figures 6 and 8). Shaft 198 extends upwardly through bearing 204 transversely to the axis of shaft 206b and is connected thereto by nuts 216 and 218.

Thus it will be seen that the shaft 206b of fulcrum stud 206, in effect, is a crank on shaft 82. Furthermore, by adjusting fulcrum stud 206 with respect to eccentric bearing 90, the axis of shaft 206b may be moved toward or away from the axis of shaft 82, thus increasing or decreasing the length of the stroke imparted by fulcrum stud 206 to shaft 198 (Figures 3 and 8) through eccentric bearing 204. Thus, the amount of water pumped by pump 36 may be readily controlled by making one simple adjustment.

Referring to Figures 19 and 20, as described hereinabove, the sealer blade assembly 40 is mounted on sealer table 42. The envelopes are fed across sealer table 42 by conveyor belt 32 (Figure 3) and separator foot 48, and pressure feet 50 and 52 coact with the split sealer table 42 (Figures 19 and 20) to open the flap of each envelope, so that it passes beneath portion 42b of table 42 into contact with the blade of the sealer assembly 40, all as will be fully described hereinafter. The sealer blade assembly includes a combination reservoir and sealer blade, generally indicated at 220 (Figures 21 and 24). The reservoir portion 220a of the combination sealer blade and reservoir includes four integral walls and a dividing partition 220b (Figures 22 and 24). The sealer blade portion 220c is V-shaped in cross section (Figure 23) and as it is followed rearwardly, it gradually tapers upwardly toward sealer table 42 (Figure 21). The upper edge of sealer blade portion 220c has a flange 220d (Figure 24) thereon, which, together with the top surface of the walls of reservoir portion 220a, are soldered to the undersurface of table 42. This closes the tops of both the sealer blade and reservoir portions of the combination sealer blade and reservoir 220. The sealer blade is provided with a longitudinal slot 222 extending through its bottom edge, through which water is supplied to the gummed surface of each envelope flap. Dividing partition 220b (Figure 24) divides the reservoir into inlet and outlet sections 224 and 226 which are connected by bypass passage 228. Inlet and outlet sections 224 and 226 of reservoir 220a are connected to the interior of sealer blade 220c by inlet port 230 and outlet port 232, respectively.

The bottom of reservoir 220a is closed by a cap, generally indicated at 234 (Figures 22 and 25). Cap 234 is connected to reservoir 220a by means of a pair of screws 238 and 240 (Figure 22), and the joint between cap 234 and reservoir 220a is sealed by a gasket 242. Cap 234 includes inlet and outlet ducts 234a and 234b (Figure 22), which extend upwardly into reservoir 220a and open just beneath sealer table 42. Inlet duct 234a is connected to plastic conduit 188 (Figure 3), and outlet duct 234b is connected by a plastic conduit 244 (Figures 3, 9 and 19) to a nipple 246 formed on cover 152 above the overflow section 148 of tank 38. Thus, water pumped up through conduit 188 into the reservoir 220a through inlet duct 234a (Figure 24) flows out into the sealer blade through port 230, and any excess water bypasses port 230 through bypass passage 228. The water flows through the blade as indicated by the arrows in Figure 24, and flows out of the blade through outlet port 232 to outlet duct 234b. Because the opening in outlet duct 234b (Figure 22) is positioned right underneath sealer table 42, the reservoir and the sealer blade have to be completely filled before any overflow or return will take place. This ensures that the blade will always be amply supplied with water.

To guide the flaps of envelopes beneath the sealer blade, to hold the flaps into contact with the sealer blade, and to catch any drops of water that may drop from slot 222 (Figure 21), a tension blade, generally indicated at 246 (Figures 19, 20, 21 and 25), is provided. The tension blade 246 includes a flap-guiding portion 246a (Figure 19), slanting downwardly to the right, as viewed in Figure 19, which guides the flaps of the envelopes upwardly toward the sealer blade. Portion 246a of tension blade 246 includes a downwardly-extending flange 246b which is attached to cap 234 by screws 248 and 250 to mount tension blade 246 on the sealer blade assembly. The tension blade portion 246c is V-shaped in cross section and conforms to the shape of the sealer blade 220c (Figures 21, 23 and 25). It will be noticed that when the flap of an envelope passes between the tension and sealer blades, it is bent into a V shape, while the body of the flap bearing against the underside of table 42 will force the apex of this V (Figure 23) into contact with the moistening slot 222 of the sealer blade 220c. Thus, the tension blade ensures excellent contact between the gummed surface of each flap and moistening slot 222, causing the water-filled slot 222 to thoroughly moisten the gummed surface of each envelope flap.

It will be noticed that the forward end of the tension blade portion 246a of tension blade 246 has a slot 250 (Figure 25) in its bottom. This is to direct any excess water dripping from the slot 222 in sealer blade 220c onto the tension blade 246a into an overflow cup 234c (Figure 21). Cup 234c is formed as an integral part of cap 234 and is connected by a passage 252 to the overflow duct 234b. Thus, any water passing through slot 222 (Figure 24) in the tension blade and not applied to an envelope flap drops upon the tension blade and is directed into cup 234c. The water flows from cup 234c into overflow duct 234b, and thus it passes into the overflow section 148 (Figure 8) of tank 38.

Thus, when the machine is to be used, tank 38 is filled through opening 165 (Figure 9), which is then plugged by plug 166. Next, the switch 254 (Figure 1) controlling motor 30 (Figure 3) is closed and motor 30 then drives shaft 82 (Figure 6). Shaft 82 drives fulcrum stud 206 (Figures 3 and 6), which drives actuating shaft 198 through eccentric bearing 204 with a reciprocating action. As shaft 198 (Figures 8 and 10) moves upwardly, check valve 180 closes and water is forced past ball 172 into well 168a. On the downward stroke of shaft 198, ball 172 closes intake duct 168b and air is forced past check valve 180. As this pumping action continues, well 168a, conduits 178 and 188 and the sealer blade reservoir become filled with water. Then, during each downward stroke of shaft 198, the diaphragm pumps water through port 230 into sealer blade 220c (Figure 24). The water which has circulated through the blade passes out port 232 and thence down through duct 234b and conduit 244 to the overflow section 148 (Figure 8) of tank 38.

During operation of the machine, the water circulating through sealer blade 220c (Figure 24) picks up foreign material, such as the adhesive from the flaps of the envelopes being sealed, which enters the sealer blade through the slot 222. The circulating water carries this foreign material back to the overflow section 148 (Figure 8) of tank 38, where it settles to the bottom. Screen 142 filters the water as it passes from the overflow section into the supply section, preventing recirculation of the foreign material. This circulation of water through the sealer blade keeps the sealer blade clean, so that slot 222 cannot become blocked with adhesive material, and furthermore, the foreign material, when removed from the sealer blade, is segregated in tank 38, so that it cannot be recirculated. After a period of extended use, it is a simple matter to loosen wing nuts 162 and 164 (Figure 3) and remove the tank 38 and screen 142 (Figure 8) for cleaning.

As pointed out hereinabove, a separator foot 48 and two pressure feet 50 and 52 (Figure 3) are provided to separate the flap from each envelope as it passes across the sealer table 42 and to hold the envelope in contact with the conveyor belt 32 so that the conveyor belt will feed the envelopes. Referring to Figures 19 and 20, slot 54 divides the sealer table into sections 42b and 42c. Section 42c is positioned in a plane beneath the plane of the main portion of section 42b (Figure 19). This permits separator foot 48 (Figure 3) to separate the envelopes as it presses downwardly upon conveyor belt 32. Separator foot 48 (Figure 17) includes a pair of supporting brackets 256 by means of which separator foot 48 is mounted on a stud shaft 258 (Figure 14) mounted on and extending forwardly from wall 64 (Figure 4). Separator foot 48 (Figure 2) is resiliently pressed downwardly by arm 262a of a coil spring 262. The other end of spring 262 is connected to nut 264. Referring to Figures 12 and 17, it will be noted that separator foot 48 has a cutout portion 48a, which is semicircular in shape and is positioned directly above conveyor belt 32. To limit downward movement of separator foot 48, it is provided with an adjustable screw 266, which is mounted on a bracket 48b. The lower end of screw 266 (Figure 14) bears on a pin 268 mounted on wall 64. Thus, by adjusting the screw 266 (Figure 14), the position of separator foot 48 with respect to belt 32 may be controlled. As the separator foot extends around belt 32, it efficiently separates the envelopes fed by belt 32.

Each envelope is maintained in contact with belt 32 and its flap opened by pressure foot 50. Pressure foot 50 includes a hub portion 50a (Figure 16) which pivotally mounts pressure foot 50 on stud shaft 272 (Figure 14). Stud shaft 272 includes a portion 272a of reduced diameter, which extends through wall 64 (Figure 2) and is connected to wall 64 by nut 260. A coil spring 274 (Figure 2) is mounted on the outer end of shaft 272, has one end secured to nut 276, and the other end 274a (Figure 11) presses foot 50 downwardly toward belt 32. The lower end of this foot is curved to fit the shape of belt 32 (Figures 12 and 16), and thus this foot, in addition to holding the envelope in contact with the conveyor belt, also separates the flap from the body of each envelope. To limit downward movement of pressure foot 50, it is provided with an adjustable screw 290, which is mounted on foot 50 in a threaded hole and has its lower end in engagement with the portion of separator foot 48. Thus, by adjusting screw 290 (Figure 11), the relationship between foot 50 and conveyor belt 32 is controlled.

Pressure foot 52 (Figures 2, 11, 14 and 18) includes a hub portion 52a, by means of which foot 52 is pivotally mounted on stud shaft 278 (Figures 2 and 14). Stud shaft 278 (Figure 2) includes a portion of reduced diameter 278a (Figure 2), which extends through a hole in wall 64. The shaft 278 is secured to wall 64 by means of nut 280. Pressure foot 52 is pressed downwardly toward conveyor belt 32 by means of a coil spring 282 mounted on the forward end of stud shaft 278. One end of coil spring 282 is connected to nut 284, and the other end 282a (Figure 11) presses downwardly upon pressure foot 52. To limit downward movement of foot 52, it is provided with an adjustable screw 286, which is mounted in a threaded hole in a lug 52b (Figure 14) formed on the hub 52a of foot 52. The lower end of screw 286 engages a pin 288 on wall 64, and thus by adjusting screw 286 upwardly and downwardly, the relationship of foot 52 with respect to belt 32 may be adjusted.

It will be noted that pressure foot 52 includes a foot portion 52c (Figure 11) of substantial length. This foot portion has a lower surface 292 (Figure 13) which coacts with belt 32 to maintain the flap 270a separated from each envelope 270. At this time, the flap 270a passes beneath portion 42b (Figures 19 and 20) of sealer table 42, and then it is guided by the undersurface of the sealer table 42 and the guiding portion 246a (Figure 19) of tension blade 246 to the sealer blade 220c (Figure 21). As pointed out hereinabove, as the flap of each envelope passes sealer blade 220c, tension blade 246 places the flap under tension, insuring contact between its gummed surface and the moistening slot in the sealer blade.

In order to separate the flaps of light envelopes, a pressure foot 294 (Figures 2 and 11) is provided. This pressure foot is, in reality, one end of a coil spring 294a, the coil of which is mounted on a stud shaft 296, which is secured to wall 64. The other end of coil spring 294a is connected to nut 298. The end of pressure foot 294 bears downwardly upon envelopes just before they pass beneath section 42b of the sealer table. As this pressure is applied rearwardly of belt 32 (Figure 13), it coacts with the leading edge of portion 42b of plate 42 to separate the flap from the body of each light envelope. Once the leading edge of an envelope is positioned beneath section 42b of sealer table 42, section 42b is positioned between the flap and the envelope, the flap then being fed into contact with the sealer blade. Thus, pressure feet 50, 52 and 294 (Figures 2 and 11) coact with the sealer table 42 to separate the flap from envelopes passing through the machine, so that they will pass beneath portion 42b of plate 42 and across the sealer blade. After they have passed the sealer blade, their leading edges are gripped between feed roller 34 and the pressure roller 56 and fed from the machine.

The pressure feet and feed roller are covered by a housing, generally indicated at 300 (Figures 1 and 11). This housing is pivotally mounted on a shaft 302, which is mounted on the framework of the machine. When housing 300 is raised, it pivots about shaft 302, exposing the pressure feet and the feed roller. When it is in a lowered position, its downward movement is limited by a limit stop 304 (Figures 3 and 11), and it is held in this position by a spring 306, which snaps beneath limit stop 304.

The envelopes to be sealed are positioned above plate 44, and their flaps positioned downwardly. The forward edges of the envelopes abut against wall 300a (Figures 1 and 3) of housing 300, and they are supported at an angle by means of a guide 46 (Figures 1 and 2). Guide 46 includes a supporting member 308, which extends through a bracket 310 on the underside of table 44 (Figure 3). Thus, guide 46 may be adjusted longitudinally with respect to table 44 to accommodate envelopes of different sizes. When the hopper has been filled with envelopes, they are pressed rearwardly so that their rear edges are positioned adjacent plate 74 (Figure 1). Then the undersurface of the lowermost envelope is engaged by the exposed portion of conveyor belt 32 (Figure 1), and fed through the machine. The envelopes are fed singly by conveyor belt 32, separator foot 48 (Figure 11) insuring that only one envelope will pass through the machine at a time.

It may thus be seen that by virtue of the inclination of hopper table 44 downwardly (see Figure 1) with respect to the direction of travel of the envelopes that there is a natural tendency for the envelopes to feed toward the conveyor belt. Also because of the upward inclination of portion 42b of table 42, the envelope as it feeds along tends to bridge the hollow between the two tables, i. e. the body of the envelope tends to bridge this hollow, while the flap, being separated by the buckling action (see Figs. 12 and 13) of belt 32 and the pressure feet, travels along table portion 42c (see Fig. 3) which underlies table portion 42b. Hence it follows that the inclined tables, the pressure feet 50 and 52, belt 32 and table portion 42c coact in a highly efficient manner to effect separation of the flap from the body of the envelope. Furthermore, this separation of the flap greatly facilitates its entry or passage over plate 246 (Fig. 19).

Thus, a practical and efficient sealing machine has been disclosed, in which the sealer blade is constantly supplied with water and in which the sealer blade is cleaned by the water circulating through it. Furthermore, in this construction, the pressure feet are designed so that a large number of different sizes and thicknesses of envelopes may be sealed without requiring adjustments. If adjustments are required in separator foot 48 or pressure feet 50 and 52, these adjustments may be easily made by raising cover 300 and adjusting screws 266, 286 and 290. The machine has a positive feed for feeding envelopes from the machine, which is also designed to efficiently seal each envelope as it leaves the machine. Furthermore, the machine is also so constructed that it may be manually operated by means of a crank. It will thus be seen that the several objects hereinabove mentioned, as well as many others, are successfully accomplished.

As many possible embodiments may be made of the above invention and as many changes might be made in the embodiment above set forth, all without departing from the scope of the invention, it is to be understood that all matter hereinabove set forth or shown in the accompanying drawings is to be interpreted as illustrative and not in a limiting sense.

I claim:

1. In a letter sealing machine, in combination, a sealer table, means forming a slit in said table to divide said table into two sections, a sealer blade mounted beneath one of said sections, a conveyor belt circular in cross section for conveying envelopes across said sealer table, means to drive said conveyor belt, a pressure foot, and means to resiliently urge said pressure foot toward said belt, the face of said pressure foot juxtaposed to said belt being curved to fit said belt, the face of said foot and said belt acting on each envelope fed through said machine to separate the flap from the envelope so that the flap passes through the slit in said sealer table and thence into contact with said sealer blade to moisten the gummed flap.

2. In a letter sealing machine, in combination, a sealer table, a sealer blade positioned beneath said sealer table and having a moistening slot therein, means to supply water to said sealer blade, a conveyor belt for feeding envelopes across said sealer table, said conveyor belt being circular in cross section, a pressure foot, means resiliently urging said pressure foot towards said belt, said pressure foot having a curved lower end, said pressure foot end coacting with said belt to separate the flaps from each envelope passing therebetween and also acting to hold said envelope in engagement with said conveyor belt to insure proper conveyance thereof by the conveyor belt, and a second pressure foot, said second pressure foot having a foot portion of substantial length juxtaposed to said belt, the acting surface of said foot portion being curved to fit said belt, said second foot maintaining said flap separated from said envelope so that it passes beneath said sealer table into contact with said sealer blade.

3. In a letter sealing machine, the combination of a table to support the body of an envelope during the sealing operation, means forming a hopper at the receiving end of said table to receive a stack of envelopes with their flaps in closed position, a conveyor element movably associated with said table for successively conveying envelopes thereover from said hopper, a movable member overlying said conveyor element, said member and said element being positioned adjacent that portion of said table along which the flap edge of the envelope travels and positioned to engage the opposite sides of said envelope along its flap edge, said element and said member being configured to buckle the envelope adjacent its flap edge and thereby cause the envelope flap to separate from the envelope body, and means to receive and moisten the separated envelope flaps as the envelope travels over said table.

4. A machine in accordance with claim 3, wherein the last-mentioned means includes a portion of the table which is bent downwardly from the general plane thereof and along which the separated envelope flap slides.

5. A machine in accordance with claim 3, wherein the last-mentioned means includes a portion of the table which is bent downwardly from the general plane thereof and along which the separated envelope flap slides, said last-mentioned means also including an upwardly inclined flap guiding member which receives the flap from said table portion and guides it to the moistening means.

6. A machine in accordance with claim 3, wherein said last-mentioned means underlies said table.

7. In a letter sealing machine, in combination, an envelope supporting table comprising downwardly and upwardly inclined portions, said inclinations being in respect to the direction of travel of an envelope through the machine, means to convey an envelope over said table, downwardly biased pressure means overlying said conveying means to force thereagainst portions of the envelope adjacent its flap edge, said pressure means being located between the ends of said table and accordingly in the hollow thereof, thereby to effect a downward separation of the flap from the body of the envelope, the upwardly inclined portion of said table including a section lying in a generally horizontal plane to receive the downwardly deflected flap, and means underlying the upwardly inclined portion of said table to receive and moisten the flap as the envelope travels over said last-mentioned table portion.

8. A machine in accordance with claim 3, wherein the conveyor element includes a belt, the upper surface of which is convex and wherein the movable member which overlies the conveyor belt includes a lower convex surface so that when an envelope is gripped between said surfaces it buckles the envelope portion adjacent the flap edge thereof causing the flap to be deflected downwardly and accordingly separated from the body of the envelope.

9. In a letter sealing machine, in combination, a sealer device including a sealer blade having an elongated wall portion in which is formed a long narrow moistening slot, and a reservoir having a passage in fluid communication with the sealer blade so as to supply water to the moistening slot, water inlet means and water outlet means associated with said reservoir, said outlet means having a flow capacity at least equal to the flow capacity of the inlet means and so positioned as to maintain the level of the water in the reservoir above the bottom of the passage to the sealer blade, means to convey envelopes past said slot to moisten the gummed portions of the flaps thereof, a water tank, a supply conduit connecting said tank with said inlet passage, an exhaust conduit connecting said tank with said outlet passage, a pump associated with said supply passage to pump water therethrough to said reservoir, and a motor for driving said pump whereby water is pumped to said reservoir, circulated therethrough and exhausted therefrom to thereby effect a constant supply of circulating water to said slot.

10. In a letter sealing machine, in combination, a sealer device including a sealer blade having an elongated wall portion in which is formed a long narrow moistening slot, and a reservoir having a passage in fluid communication with the sealer blade so as to supply water to the moistening slot, water inlet means and water outlet means associated with said reservoir, said outlet means having a flow capacity at least equal to the flow capacity of the inlet means and so positioned as to maintain the level of the water in the reservoir above the bottom of the passage to the sealer blade, means to convey envelopes past said slot to moisten the gummed portions of the flaps thereof, a water tank, a supply conduit connecting said tank with said inlet passage, an exhaust conduit connecting said tank with said outlet passage, a pump associated with said supply passage to pump water therethrough to said reservoir, a motor for driving said pump whereby water is pumped to said reservoir, circulated therethrough and exhausted therefrom to thereby effect a constant supply of circulating water to said slot, and a screen in said tank separating said supply and exhaust conduits.

11. In a letter sealing machine, in combination, a sealer device including a sealer blade having an elongated wall portion in which is formed a long narrow moistening slot, and a reservoir having a passage in fluid communication with the sealer blade so as to supply water to the moistening slot, water inlet means and water outlet means associated with said reservoir, said outlet means having a flow capacity at least equal to the flow capacity of the inlet means and so positioned as to maintain the level of the water in the reservoir above the bottom of the passage to the sealer blade, means to convey envelopes past said slot to moisten the gummed portions of the flaps thereof, a water tank, a supply conduit connecting said tank with said inlet passage, an exhaust conduit connecting said tank with said outlet passage, a pump associated with said supply passage to pump water therethrough to said reservoir, a motor for driving said pump whereby water is pumped to said reservoir, circulated therethrough and exhausted therefrom to thereby effect a constant supply of circulating water to said slot, and an overflow cup underlying at least a portion of said slot and communicating with said exhaust conduit.

WILLIAM H. UHL.

REFERENCES CITED

The following references are of record in the file of this patent:

UNITED STATES PATENTS

| Number | Name | Date |
| --- | --- | --- |
| 1,632,648 | Gray | June 14, 1927 |
| 2,259,557 | Drummer et al. | Oct. 21, 1941 |
| 2,337,721 | Kokay | Dec. 28, 1943 |
| 2,369,314 | Ryan | Feb. 13, 1945 |
| 2,372,742 | Ryan | Apr. 3, 1945 |
| 2,404,193 | Ryan | July 16, 1946 |